May 19, 1931. F. A. HOWARD ET AL 1,806,571
PROCESS FOR RECOVERING GASOLINE FROM GAS
Filed Feb. 20, 1926
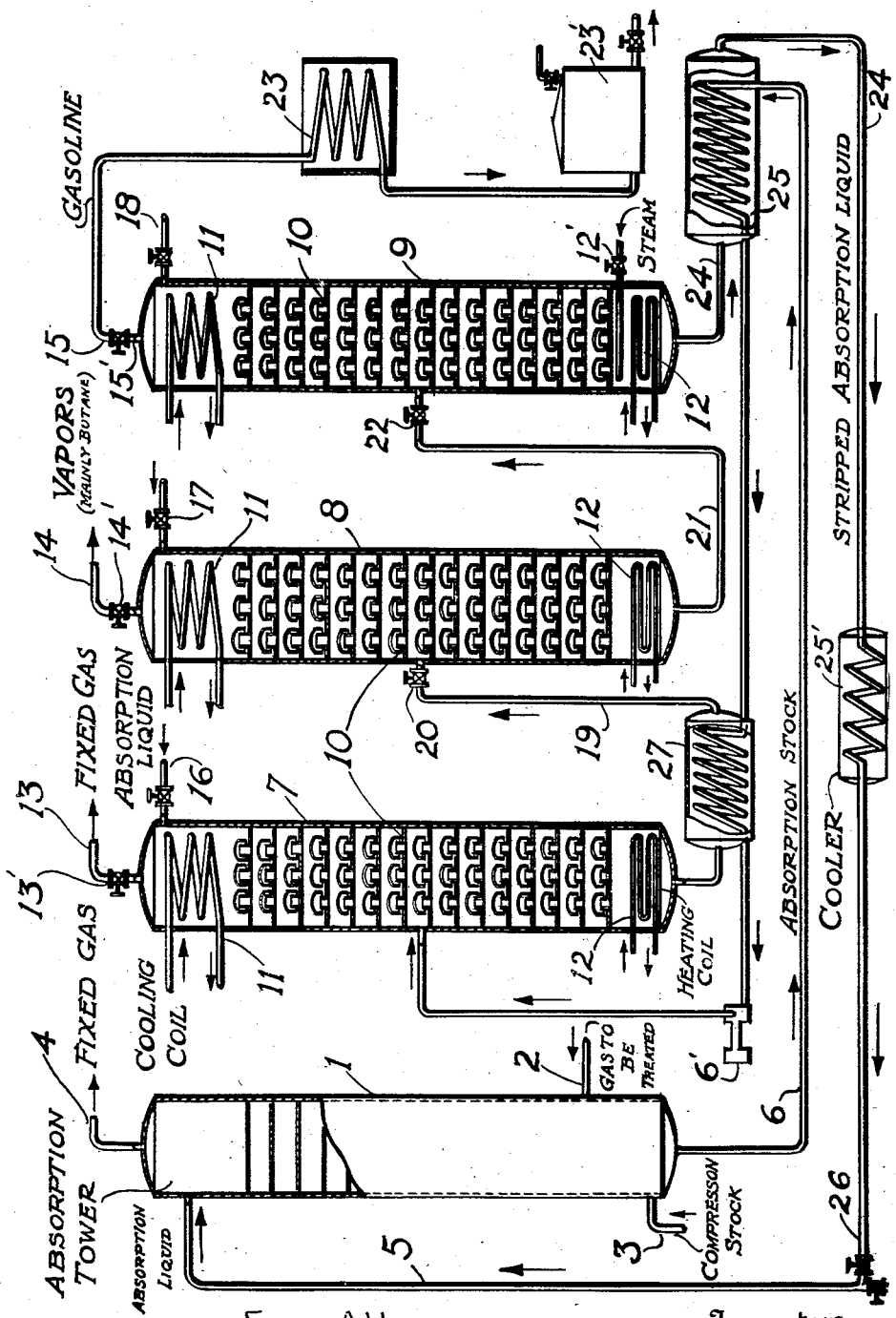
Frank A. Howard and Nathaniel E. Loomis, Inventors
By Attorney Patented May 19, 1931

1,806,571

UNITED STATES PATENT OFFICE

FRANK A. HOWARD, OF ELIZABETH, AND NATHANIEL E. LOOMIS, OF WESTFIELD, NEW JERSEY, ASSIGNORS TO STANDARD OIL DEVELOPMENT COMPANY, A CORPORATION OF DELAWARE

PROCESS FOR RECOVERING GASOLINE FROM GAS

Application filed February 20, 1926. Serial No. 89,644.

This invention relates to improvements in the art of recovering condensible constituents from hydrocarbon gases. The invention will be fully understood from the following description, taken in connection with the accompanying drawing, in which the figure is a diagrammatic side elevation of a suitable form of apparatus.

Referring to the drawing, reference numeral 1 denotes an absorption or scrubbing tower, into which the gas to be treated is introduced through a pipe 2. This gas may be natural gas, still gases, or other suitable source of gasoline hydrocarbon vapors. When natural gas is used, it will ordinarily be compressed and cooled as a preliminary to the absorption. The condensate obtained in the compression and cooling operation may be introduced into tower 1 through pipe 3, or into some other suitable portion of the system, when desired. Fixed gases are taken off from the absorption tower 1 through pipe 4, and an absorption liquid is introduced through pipe 5. The absorption stock (absorption liquid containing gasoline constituents and lighter hydrocarbons) is withdrawn through pipe 6, through heat exchange means subsequently described, and then is forwarded by pump 6' to a rectifying tower 7.

In accordance with our invention, a plurality of series-connected rectifying towers 7, 8, and 9 are provided and the absorbed constituents are subjected to successive rectification in the presence of the absorption liquid. A gasoline of desirable properties is obtained as a distillate from the last tower of the series. The absorption liquid is preferably an oil miscible with the condensible constituents of the gas and substantially non-volatile under the conditions imposed. Mineral seal oil, gas oil, heavy naphtha, or similar hydrocarbons, are suitable.

The towers 7, 8, and 9 are each provided with liquid and vapor contact means, for example bell-cap plates 10, preferably substantially throughout the tower. Each tower has also a cooling or refrigerating coil 11 near its top and a heating coil 12, or other heating means, near its bottom. Outlet pipes 13, 14, and 15 are respectively connected to the towers 7, 8, and 9 adjacent their tops, valves 13', 14', and 15' being arranged in these pipes for regulating the pressure in the towers. The rectification may be conducted in the presence of reflux formed only by the condensing action of the coils 11, or additional cool absorption oil may be introduced through pipes 16, 17, and 18. The added oil may be of the same kind as that used in the absorption tower 1, or any other suitable oil.

The following is illustrative of the operation of our method, as applied to a gas having the following approximate composition:

|  | Per cent |
|---|---|
| Nitrogen and methane | 54.8 |
| Ethane | 20.4 |
| Carbon dioxide | 0.2 |
| Propane | 14.7 |
| Butane | 6.9 |
| Pentane and higher hydrocarbons | 3.0 |

It will be understood that the temperatures and pressures desirable will vary materially with the composition of the gases being treated, as well as with the nature and amount of the absorption liquid. The specific data given, therefore, are to be considered as illustrative only.

Fixed gases are substantially completely removed from the absorption stock in tower 7. The absorption stock containing butane and heavier gasoline constituents, as well as some of the propane, is withdrawn from pipe 19, in which a valve 20 is arranged, to the intermediate portion of the tower 8. In that tower most of the butane and any residual lighter hydrocarbons are separated by rectification. The absorption stock, which now contains gasoline constituents substantially free from "wild" components, is passed through pipe 21 to the tower 9. A valve 22 is arranged in the pipe 21. The gasoline vapors are distilled off in tower 9 and pass through pipe 15 to the condenser 23 and receiver 23'. Steam may be passed into tower 9 through pipe 12'. The absorption oil substantially free from absorbed constituents is passed through pipe 24 to heat exchanger 25 and cooler 25', and thence through pipes 26 and 5 back to the absorption tower 1.

In the exchanger 25 the hot stripped oil imparts some of its heat to the absorption stock. The preheated stock may then be passed through exchanger 27 to cool the hot product from tower 7. In this way the preheat of the absorption stock is increased to the desired value. Cooling of the liquid from the bottom of the tower 8 is ordinarily unnecessary.

By the use of series-connected towers as described, we are able to obtain a very satisfactory segregation of the desirable gasoline components. The butane product (which may contain some propane) from the tower 8 may be blended in suitable proportion with the gasoline from tower 9, if desired. The gasoline from tower 9 may be sold as such but will ordinarily be blended with heavier gasoline. More or less of the butane product may be added to this blend or to the gasoline from tower 9.

The tower 7 is preferably operated under relatively high pressure, for example 150-200 lbs. per square inch. Even higher pressures, up to 300 lbs. or more, may be utilized, especially when the temperature of the top of the tower is regulated by means of cooling water and not by refrigeration. A cooling liquid will be supplied to the coil 11 in tower 7 in such amount and at such a temperature as to cause the condensation of a substantial amount of the heaviest constituent that it is desired to remove from the tower, ordinarily propane. The refluxing propane carries down with it heavier hydrocarbons that may be passing up the tower. The lower portion of the tower is adequately heated from the coil 12 so that fixed gases and most of the propane will be expelled from the absorption stock before it emerges from the tower through pipe 19. The temperature in the lower portion of the tower 7 may vary between about 525-625° F. and in the upper portion between about 20-40° F.

In the tower 8 the pressure is less, for example about 25-60 lbs. per square inch. The heating and cooling are similarly regulated to obtain an overhead product consisting mostly of butane, leaving the pentane and heavier gasoline hydrocarbons in the absorption stock. This tower may be so controlled as to permit some butane to pass through with the absorption stock, since butane in limited amounts is desirable in the gasoline product. The temperature in the lower portion of the tower 8 may be about 350-450° F. and in the upper portion about 75-100° F.

The tower 9 is utilized for the removal of the gasoline from the absorption stock. This may be done in any suitable way. It is desirable, however, to supply rectification means similar to those described in connection with towers 7 and 8, as in this way the possibility of carrying over some of the absorption oil is avoided. When using gas oil as the absorption stock, the lower portion of the tower 9 may be heated to about 300-350° F., the temperature in the upper portion being about 90-130° F. The pressure in tower 9 may be considerably lower than that in tower 8. Pressures from atmospheric to about 10 lbs. per square inch gauge pressure may be utilized in the tower 9. Subatmospheric pressures are not precluded here.

It will be understood that the various details of operation are subject to modification in accordance with the requirements of the gas being treated. Two rectification towers are a minimum requirement for our invention, but any desired additional number of such towers may be used. In some cases the last tower of the series may be replaced by a steam still, or other means, for stripping out the gasoline from the absorption oil.

The segregation of the desired gasoline constituents by our process may be designated "absorptive rectification". It is characterized by the presence of the absorption liquid in the vapor-liquid contact zone, and is in this respect distinguished from prior processes in which rectification takes place in the presence of reflux formed only from the constituents being rectified. When cool, fresh absorption liquid is introduced into the upper portion of the rectifying towers, as described above, absorptive rectification takes place throughout the towers. Such absorption liquid may be used as a substitute for part or all of the cooling that would otherwise be necessary to prevent escape of desired components.

Various modifications of procedure and apparatus may be made within the scope of the appended claims, in which it is our intention to claim all novelty inherent in the invention, as broadly as the prior art permits.

We claim:

1. Process of rectifying condensible constituents derived from a hydrocarbon gas, comprising passing relatively non-volatile absorption liquid charged with such constituents downward through a vapor and liquid contact zone, maintaining in such zone a pressure substantially above atmospheric, heating the lower portion of the zone, and cooling the upper portion thereof to prevent desired components from escaping, whereby the condensible constituents are rectified in the presence of the absorption liquid, introducing fresh, cool absorption oil into the upper portion of the contact zone, withdrawing the gases and vapors from the rectification to a point without the system, withdrawing the absorption liquid and subsequently separating the desired constituents therefrom.

2. Process of rectifying condensible constituents derived from a hydrocarbon gas and absorbed in a hydrocarbon oil miscible therewith and substantially non-volatile at temperature and pressure of the rectification, the improvement which comprises passing the charged absorption oil into the intermediate portion of a rectification zone maintained under a pressure materially above atmospheric, positively cooling the upper portion of the rectification zone, taking off from the upper portion of such zone the fixed gas content, including at least part of the propane, of the absorption oil, passing the absorption oil from a lower portion of such zone into an intermediate portion of a second rectification zone maintained under a pressure above atmospheric but less than that in the first zone, positively cooling the upper portion of the second rectification zone, taking off from the upper portion of such second zone a substantial amount of the butane content of the absorption oil, taking off from the lower portion of such second zone the absorption liquid substantially free from absorbed constituents other than gasoline constituents, then passing such absorption liquid into a zone in which the gasoline constituents are expelled from the absorption oil, and recovering the gasoline constituents.

FRANK A. HOWARD.
NATHANIEL E. LOOMIS.